June 30, 1942.  R. H. VARIAN ET AL  2,287,845
THERMIONIC VACUUM TUBE AND CIRCUITS
Filed March 8, 1939   5 Sheets-Sheet 1

INVENTORS
RUSSELL H. VARIAN
DAVID PACKARD
BY Herbert H. Thompson
ATTORNEY.

June 30, 1942.  R. H. VARIAN ET AL  2,287,845
THERMIONIC VACUUM TUBE AND CIRCUITS
Filed March 8, 1939   5 Sheets-Sheet 2

INVENTORS
RUSSELL H. VARIAN
DAVID PACKARD
BY Herbert H. Thompson
their ATTORNEY.

June 30, 1942.   R. H. VARIAN ET AL   2,287,845
THERMIONIC VACUUM TUBE AND CIRCUITS
Filed March 8, 1939   5 Sheets-Sheet 3

INVENTORS
RUSSELL H. VARIAN
DAVID PACKARD
BY Herbert ~~~
ATTORNEY

June 30, 1942.  R. H. VARIAN ET AL  2,287,845
THERMIONIC VACUUM TUBE AND CIRCUITS
Filed March 8, 1939   5 Sheets-Sheet 5

INVENTORS
RUSSELL H. VARIAN
DAVID PACKARD
BY their ATTORNEY.

Patented June 30, 1942

2,287,845

UNITED STATES PATENT OFFICE 2,287,845

THERMIONIC VACUUM TUBE AND CIRCUITS

Russell H. Varian and David Packard, Stanford University, Calif., assignors to The Board of Trustees of The Leland Stanford Junior University, Stanford University, Calif.

Application March 8, 1939, Serial No. 260,546

4 Claims. (Cl. 250—27)

The present invention relates, generally, to means and methods for converting direct or low frequency current into alternating current, and particularly to alternating currents of frequencies of $10^8$ cycles or more per second, and the invention has reference, more particularly, to novel thermionic vacuum tube and circuit construction operable as electrical converters, including oscillators, amplifiers, and detectors employing control grids in connection with cathodes and anodes connected to resonant circuits.

The principal object of the present invention is to remove limitations inherent in the known types of thermionic three-electrode tubes and circuits, namely, the limitation dependent on "active grid loss," and the limitation imposed by the flow of current to the control grid whenever it becomes positive with respect to the cathode. Removal of the first limitation renders it possible to operate three-electrode tubes at frequencies beyond the range heretofore obtainable, while removal of the second limitation contributes to the same end as well as to improving the efficiency and flexibility of vacuum tube circuits.

Another object of the invention is to provide a control grid arrangement in the class of tubes generally included in the "three-electrode" classification, i. e., triodes, pentodes, and other conventional forms, which arrangement permits the grid impedance to be, as may be desired, positive, negative or effectively nearly infinite.

Still another object of the invention is to render it feasible to make three-electrode vacuum tubes for operation at high frequencies without extremely small spacings between the electrodes, thereby also facilitating the manufacture of vacuum tubes for high frequency and large power rating.

Still another object of the invention is to provide vacuum tubes of the three-electrode type that constitute an integral part of the resonant circuits of which they are a part, and are thoroughly shielded against undesired escape of radiation from said circuits.

A further object of the invention is to provide means for allowing the escape of radiation from said circuits under accurately controllable conditions, or for the induction of energy into any of said circuits under accurately controllable conditions.

Yet another object of the invention is to provide a combination of circuit and three-electrode tube in which the resistance losses are less than is the case in arrangements of the customary type.

Yet another object of the invention is to provide a tube and circuit in which the high frequency electron current drawn by the control grid adds to the energy delivered to the electron circuits by the electron stream.

Yet another object of the invention is to provide a three-electrode tube having a positive space charge grid which at high frequency increases the action of the control grid upon the electron stream.

Yet another object of the invention is to provide a new and useful method of detecting a radio signal.

A further object of the present invention is to provide a novel thermionic tube that is adapted to provide one stage of radio frequency amplification in addition to serving as a detector and which is useful at both high and low frequencies.

Other objects and advantages will become apparent from the specification, taken in connection with the accompanying drawings wherein the invention is embodied in concrete form.

In the drawings,

Fig. 6A shows a modified construction detail.

Similar characters of reference are used in all of the above figures to indicate corresponding parts.

The phenomenon of active grid loss which is overcome by the present invention may be explained in connection with the conventional three-electrode tube of Fig. 1. In this figure there is shown an electron emitting filament 1, a control grid 2, and a plate 3 in an evacuated container 4. The filament 1 is heated by a battery 5; the grid 2 is biased by a battery 6, and the plate 3 is energized by a battery 7. A resonant circuit 8 comprising a condenser 9 and an inductance 10 impresses an alternating difference of potential on the grid 2. An inductance 11 in series with the plate circuit is inductively coupled to inductance 10 for feed-back control. A resistor 12 represents the load to which the system delivers energy, and an inductance 13 connected to a generator 14 and inductively coupled to inductance 10 represents the source of alternating current excitation for the system. The system as shown is capable of operating as an oscillator, as an amplifier or as a detector depending on factors of design and adjustment. The general theory of operation is well known in the prior art and will in the following be assumed without explanation except insofar as the effect of active grid loss is concerned.

Figures 1, 2, 2A:
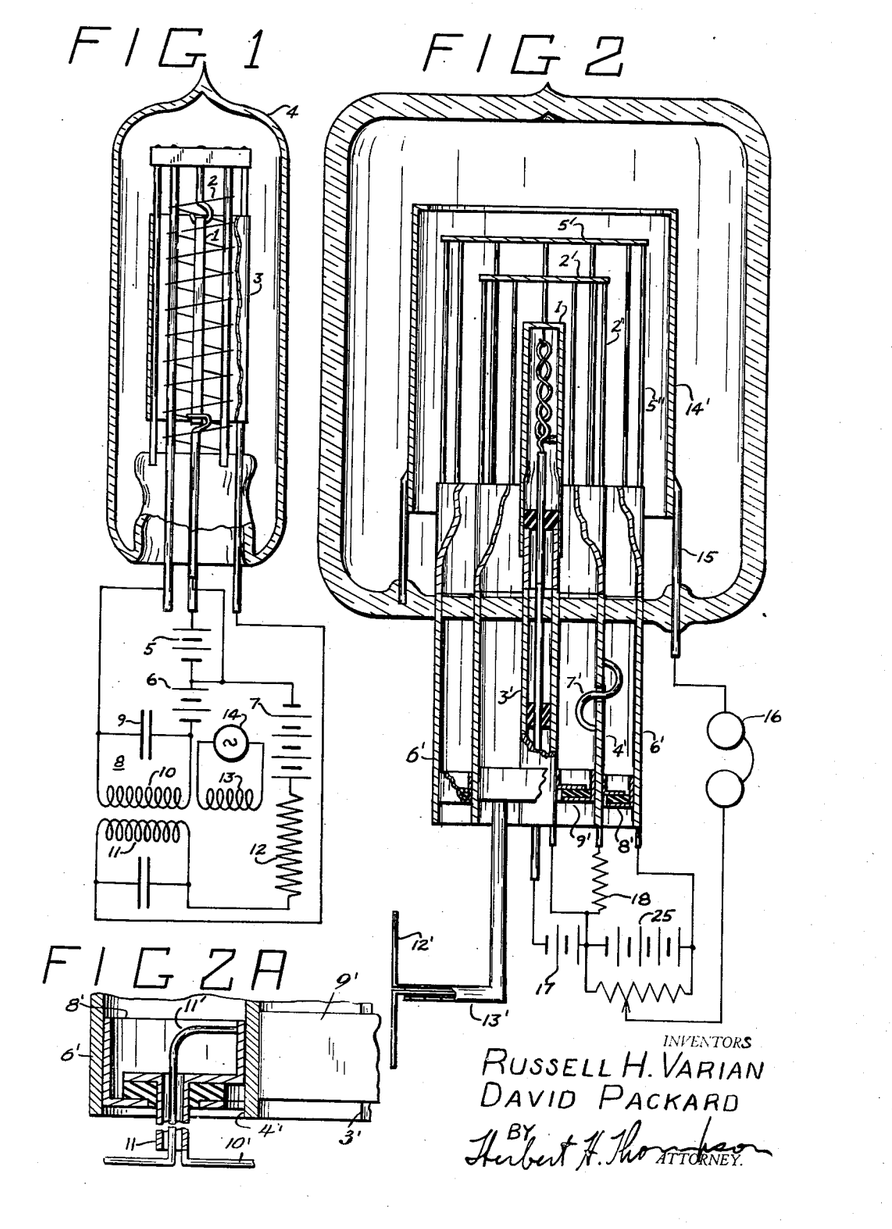
Fig. 1 illustrates in section an ordinary three-electrode tube shown for purposes of explanation.
Fig. 2 illustrates in section a preferred embodiment of the present invention.
Fig. 2A shows a modified detail of construction in section.

In the operation of the tube of Fig. 1 at low frequencies the time required for an electron to travel from the filament 1 to the plate 3 is small compared with the period, that is to the time interval corresponding to a cycle of operation. The grid 2 has its potential varied with respect to the filament 1 potential at the frequency of the system, and the impedance of the space between filament 1 and plate 3 is varied in accordance with the potential during the time the electron is passing from filament 1 to plate 3. Under these conditions energy is not transferred between the grid 2 and the electrons which pass through the grid. This statement should not be confused with the fact that a positively charged grid carries current. To avoid possible confusion, however, the subject of grid loss will be explained with reference to a grid which is negative with respect to the filament at all times, and thus does not collect electrons from the surrounding space.

It is well known in the art that so long as grid 2 remains at a constant potential, it may control the number of electrons passing from electron emitter 1 to plate 3, but it cannot influence the energy with which electrons strike plate 3. This follows because whatever the potential of grid 2 may be, the electrons in passing the grid are merely passing a potential valley or hill as the case may be, and the energy lost by the electrons in ascending the hill is all regained in going down the other side. If the grid represents a potential valley, the same is true with the signs reversed. The same is true also if the potential of the grid is changing slowly, and it is easily seen that it will remain true as long as the grid does not change its potential appreciably while the electron is in transit between filament 1 and plate 3.

If on the other hand the grid 2 does appreciably change its potential while an electron is in transit between filament 1 and plate 3, the electron may strike the plate with either increased or diminished energy, for if the height of the potential hill, or the depth of the potential valley, at grid 2 changes while the electron is in transit, the energy lost on the ascent side will in general not equal the energy gained on the descent side. The matter of whether the electron gains or loses energy as a result of the change in the potential hill or valley at grid 2 depends on the phase of the change when the electron passed through the field of grid 2.

If a stream of electrons uniformly distributed in time crosses the cyclically varying potential hill or valley at grid 2 there will be as many electrons gain energy as lose energy, and if the gain or loss is small compared with total energy, the cyclic variations in the barrier, that is, the potential of grid 2, will not increase or decrease the average energy with which the electrons strike the plate 3. However, in a three-electrode tube the electron stream is not uniformly distributed in time, and it therefore becomes necessary to investigate the phase relations existing between the maximum electron emission and the grid potentials to determine whether the electron stream on an average gains energy from, or loses energy to, the grid circuit. The greatest number of electrons will leave the filament 1 when the grid 2 is most positive, and these electrons will gain energy from the grid circuit in traveling from the filament 1 to the grid 2, and since the grid 2 will be more negative while the electrons complete their journey from the grid 2 to the plate 3, these electrons will not lose the energy they gained in traveling from the filament 1 to the grid 2. Hence, the grid 2 will lose energy to the electron stream. This is known as active grid loss.

With the tube shown in Fig. 1 operating at high frequencies, the time required for an electron to travel from the filament 1 to the plate 3 may become comparable with a period of oscillation of the system. In tubes of ordinary dimensions, the transit time in the tube becomes comparable with the period at frequencies of the order of $10^8$ cycles per second or less, the larger the tube in general the lower the frequency where transit time becomes appreciable. When the transit time of the electron traveling from filament 1 to plate 3 is an appreciable fraction of the oscillation period, the potential of grid 2 with respect to filament 1 changes materially during the time of transit of the electron from the filament 1 to plate 3, and the tube is thus subject to active grid loss.

The active grid loss is understood in the prior art. Some attempts to overcome this loss have been made, and in particular attempts to reduce the transit time of electrons in the tube by reducing the spacing between the electrodes, but none of the attempts known prior to Patent No. 2,244,747, to Russell H. Varian and Arnold J. Siegert, issued June 10, 1941, and the present invention did more than reduce the effect by dimensional design.

In the present invention, as in the above mentioned patent, the factors which determine active grid loss are controlled in such a way that the active grid loss may be eliminated entirely or reversed in sign so that the control grid may be caused to gain energy from the electron stream instead of imparting energy thereto. The methods whereby these results are accomplished in the present invention are somewhat simpler and more easily carried out in practice than those described in the patent above referred to.

As has been shown in the foregoing analysis of active grid loss, when a three-electrode tube, having conventional spacings, is connected in the ordinary way and operated at high frequency, there will be an active grid loss. This does not, however, apply to all possible element spacings and connections of a three-electrode tube. One such exception is shown in Fig. 2. In the operation of a three-electrode tube, as shown in Fig. 2, a radical departure is made from conventional practice, namely, that instead of the plate and grid potentials being in opposite phase with respect to each other these potentials are approximately in the same phase. It will now be shown qualitatively that energy will be delivered to a resonant circuit by a stream of electrons passing between cathode and plate.

Two resonant circuits are shown in Fig. 2 which circuits consist of a concentric pair of concentric lines, the inner pair consisting of cathode 1 and grid 2" having closely spaced conducting grid wires and a conducting top plate 2', and conductors 3' and 4', which are electrical continuations of cathode 1 and grid 2". The second consists of grid 2" and grid 5" also having a conducting top plate 5' and conductors 4' and 6', which are electrical continuations of grids 2" and 5" respectively. 7' is a coupling conductor which links some of the field in both resonators, and serves to couple the two resonant circuits together, if such coupling is desired in a particular case. An annular member 8' is employed for closing the end of the outer concentric line and for tuning the same by sliding this annular member in and out. It consists of two metal plates separated by a thin layer of insulating material which makes it possible to maintain conductors 4' and 6' at different direct current potentials and at the same time provides a free path for passage of high frequency currents between the two conductors. A similar annular member 9' serves the same purposes for the inner concentric line. A radiating dipole 10' (see Fig. 2A) may be connected by concentric line 11 to the outer of the concentric line resonators for linking the flux therein at 11' for removing energy therefrom. A dipole 12' is connected to the inner resonator by concentric line 13' for delivering energy thereto. The two dipoles 10' and 12' are not intended to be used simultaneously, but are shown as alternative arrangements, 10' being used if the device is serving as a transmitter, and 12' being used if the device is serving as a receiver. If the device is used as a receiver, the plate 14' may be used as a detector, and the detected signal is removed through a wire 15, and energizes phones 16 as will further appear.

The cathode 1 is heated by battery 17. Grid 2" is shown as being connected to the cathode through resistor 18, which is the usual arrangement in standard oscillators. If the device is to be used as a receiver, resistance 18 will ordinarily be replaced by a biasing battery or other source of potential. If the spacing between cathode 1 and grid 2", and the potential gradient between cathode 1 and grid 2" is such that an electron leaving cathode 1 takes approximately ½ cycle to travel from cathode 1 to grid 2", the electron stream as a whole will do work on the grid 2" as is shown in Fig. 3.

Figure 3:
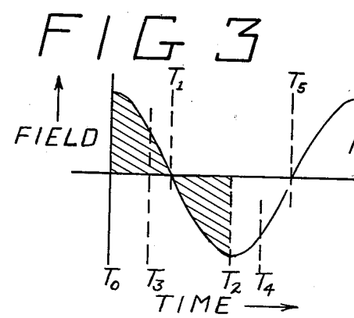
Figs. 3 and 4 are explanatory graphs.

In Fig. 3, positive values of the sine curve represent gradients between cathode 1 and grid 2" which tend to accelerate electrons traveling between cathode 1 and grid 2", while negative values represent gradients tending to decelerate electrons traveling between cathode 1 and grid 2". The greatest electron current will leave cathode 1 approximately when grid 2" is most positive, or at the time marked $T_0$. Due to the presence of the space charge barrier at the cathode and to the fact that electrons leaving the cathode have initially only their thermal velocities, actually the greatest number of electrons will leave the virtual cathode slightly in front of the cathode 1 at the time the grid is most positive. This involves a correction which may appreciably shift the phase of the electron groups at very high frequencies, but at frequencies of the order of $3 \times 10^8$ cycles and lower it may be neglected. This greatest electron current will do work on the grid if it remains in transit between cathode 1 and grid 2" for the time interval $T_2 - T_0$, as shown in Fig. 3. This allows these electrons to be accelerated for a quarter-cycle and decelerated for a quarter-cycle.

According to the convention adopted in this figure, the shaded area above the axis represents velocity gained from the grid circuit by this most numerous group of electrons that leaves the cathode when most negative during the first quarter of a cycle, while the shaded area below the axis represents the velocity lost by the electrons in the next ensuing quarter-cycle.

This is so because the curve is a graphical representation of the force acting on the electrons as a function of time, and velocity $$= k \int_{T_1}^{T_0} f dt$$

where $f$ = force and $t$ = time. Since the area below the axis is as great as the area above, these electrons lose as much velocity as they gain in traveling from cathode 1 to grid 2".

The energy gained or lost by the electrons in traveling from cathode 1 to grid 2" is $$\int_{\text{grid 2"}}^{\text{cathode}} f dD$$

where $D$ is the distance. Since the electrons are continuously gaining velocity from the direct current field in their flight from the cathode to grid 2", the electrons travel farther per unit time in the last half of their flight than they did in the first half, and hence there is a preponderance of energy lost over energy gained by the electrons.

Figure 4:
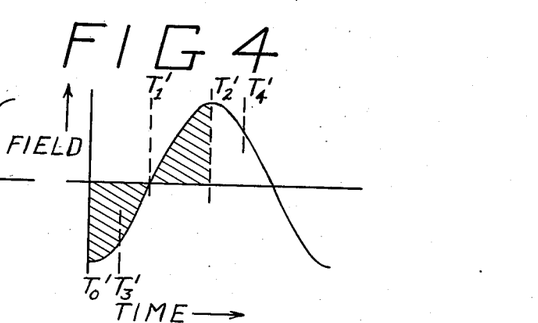

In Fig. 4 the velocity changes are shown for electrons 180° out of phase with those shown in Fig. 3. It can be seen that this group of electrons gain as much velocity per electron from the grid circuit as was lost per electron by the previous and larger group of electrons, but since this is the least numerous group of electrons, they will not extract as much energy from the grid circuit as the most numerous group of electrons added to it.

Following the same procedure we may take any other group of electrons as for instance the one leaving cathode 1 at time $T_3$ and arriving at grid 2" at time $T_4$. This group of electrons loses more energy per electron than the group leaving at $T_0$, but there is a corresponding group leaving cathode 1 at time $T_3'$, Fig. 4, and arriving at grid 2" at the time $T_4'$ which gains as much energy per electron from the grid circuit as the other group lost to it, but it will be noticed that the first mentioned group left the cathode when the grid was more positive than its mean value whereas the second group left the cathode when the grid was less positive than its mean value, and hence the first group will be more numerous than the second group and the combined effect of both groups will be to give up energy to the grid circuit. Similarly, other corresponding pairs of electron groups may be chosen till the whole cycle is covered, and it will be found that over much the greater part of the cycle the electron groups that deliver a given energy per electron to the grid circuit contain more electrons than the corresponding group that extracts the same energy per electron from the grid circuit. Of course the limited region in Figs. 3 and 4 in which the electrons that gain energy from the grid are more numerous than those that lose the same amount of energy to the grid, while representing an actual loss of energy by the grid circuit, yet the amount of energy loss is proportional to the amount of energy lost per electron of the energy losing group, multiplied by the difference between the number of electrons in the energy losing group and the number in the energy gaining group, and by inspecting the diagrams it may be seen that this product is rather small and hence does not detract from the energy gained by the grid circuit over the entire cycle.

This is valid proof that the electron stream as a whole will deliver energy to the grid circuit, and hence the so called active grid loss under these conditions will be negative in sign. This analysis does not, however, prove that the flight time above considered of the electrons passing from cathode to grid gives the maximum gain of energy from the electrons, and as a matter of fact it does not. However, it constitutes a usable flight time, and in some cases a desirable one. The active grid gain in this case is not large, but in an amplifier an active grid gain large enough to cancel all other losses and cause the circuit to oscillate may be desirable.

The largest active grid gain occurs when the flight time of the electrons between cathode and grid is somewhat greater than ½ cycle.

Due to the fact that the group of electrons, having the maximum gain of energy per electron, is not the most numerous group of electrons, and that the velocity of electrons increases from cathode 1 to grid 2", and is influenced by space charge, an exact analysis is difficult to make. Hence, the foregoing qualitative analysis is given in the belief that it is more understandable than an exact analysis would be if it were made.

This analysis neglects certain factors which should be noted here; firstly, it neglects the influence of space charge; secondly, it neglects the fact that the tubes shown have cylindrical symmetry, and therefore the field strength increases toward the cathode. The field strength in a space charge field between parallel plates increases approximately as $D^{1/3}$. These two neglected terms have opposite effects, and can be made to approximately cancel each other by choice of suitable ratios for the diameter of the cathode and the control grid. Another neglected factor is the grouping of electrons in the electron stream by the effect of fast electrons from the cathode tending to catch up on slow electrons that left the cathode at a slightly earlier time.

We will now consider the conditions which must exist between the grid and plate in order that the electron stream may deliver a maximum of energy to a resonant circuit of which the grid and the plate are a part.

Obviously, the greatest energy will be delivered to the grid plate circuit when $$\int_{grid}^{plate} f dD$$

for the average electron has its greatest value, and this can always be made a maximum for a particular grid to plate spacing and potential difference by adjusting the phase relation between the grid filament and grid plate circuit.

In the case just described, the most numerous group of electrons pass the grid when it is most negative with respect to the filament, and hence, if the electron flight time from grid to plate is short compared to a half cycle of the oscillating frequency, the grid plate circuit should be substantially in phase with the grid filament circuit, for under these conditions the motion of the most numerous group of electrons will be opposed by the strongest field, and hence retarted the most. If the flight time from grid to plate is an appreciable part of a half cycle, the phase in the grid plate circuit should be somewhat retarded with respect to the grid filament circuit, so that the most numerous group of electrons will enter the grid plate, interspace a little before the opposing field has reached its maximum, and will reach the plate a little after it has passed its maximum. Since the electrons are normally gaining velocity from the direct current field in the grid plate interspace, and as has been said before, the work done on the electrons is $$\int_{grid}^{plate} f dD$$

the field should reach its maximum somewhat after the middle of the time interval during which the most numerous group of electrons is passing from grid to plate.

In the above mentioned previous patent, an arrangement was disclosed in which the electron transit time between cathode and grid was about ¾ cycle, and the flight time between grid and plate was preferably enough to bring the total flight time between cathode and plate to roughly 1¼ cycles. In that case the alternating field between cathode and grid, and cathode and plate, were substantially 180 apart in phase. This gives substantially a maximum active grid gain. By reference to Fig. 3, it may be seen that a continuous transition from the case described in this specification to the case described in application, Patent No. 2,244,747, issued June 10, 1941, of which one of inventors hereof, Russell H. Varian, is a joint inventor, is possible. As the time $T_0$—$T_2$ is lengthened, the phase of the grid-plate circuit should be shifted by the same fraction of a cycle that the flight time between cathode and grid is lengthened.

It is therefore apparent that if the flight time between cathode and grid lies between $T_0$—$T_2$ and a point beyond $T_0$—$T_5$, the active grid loss will be negative, and that for any flight time between or beyond these limits, a proper phasing of the electric field in the plate circuit, with respect to that in the grid circuit, will cause the electron stream to deliver maximum power to the grid-plate circuits.

In Fig. 2, suitable means are shown for obtaining all possible phase differences between the cathode grid and grid plate circuit. In this figure the cathode 1 and the conductor 3' form the inner member of a concentric line resonator, while grid 2" and conducting tube 4' form the outer member of the concentric line resonator. Also, grid 2" and conducting tube 4' form the inner member of a second concentric line resonator, of which grid 5" and conducting tube 6' form the outer member. If the mesh of the grids is fine, as would ordinarily be the case, and no other coupling means is supplied, the two resonators are independent of each other. If a coupling member, such as coupling conductor 7', is inserted between the two resonators any desired degree of coupling may be obtained, and since members 8' and 9' which short the concentric lines for alternating current are adjustable, each concentric line resonator is separately tunable. As is well known in the art, the phase angle between two coupled resonant circuits may be varied by detuning one resonator slightly with respect to the other.

In a device such as has just been described, the energy with which an electron impinges on a conductor has no necessary relation to the potential of the conductor at the instant when the electron impinges. This is because the electric fields through which the electron passes change markedly while the electron is in transit. Another feature of the device shown in Fig. 2 is that the alternating electric fields are substantially completely confined within their respective concentric lines, and the electrons passing from the cathode through grids 2″ and 5″ pass completely out of the alternating electric field at grid 5″, and hence the alternating field will produce no further changes in electron velocity. The electrons therefore emerge from grid 5″ with varying velocity, and do not have these variations canceled in traveling from grid 5″ to plate 14′, as would be the case with an ordinary grid excited in the ordinary way. It is therefore possible, for either of these reasons, to use a form of detector in the present invention which is inoperative in the usual type of tubes and circuits.

In Fig. 2, grid 5″ functions as efficiently in extracting energy from the electrons in transit between grid 2″ and 5″ as though it were an impervious cylinder of metal which stopped all the electrons striking it; hence, if oscillating fields exist in the tube, electrons will emerge into the space between grid 5″ and metal cylinder 14′ with velocities different from those which they would have had if there had been no oscillating fields. If the oscillations are weak, as would be the case if the oscillations were caused by a weak signal picked up by antenna 12′, there will be nearly as many electrons speeded up as are slowed down, and hence detection of the oscillations is most efficient when plate 14′ is biased so that the difference in number of electrons caught by cylinder 14′ when there are oscillations present, and the number caught when there are no oscillations present is a maximum. There are two bias points that will meet these conditions, one when cylinder 14′ is biased so most, but not all, of the electrons can strike it, and one when most but not all of the electrons cannot strike it. Cylinder 14′ may detect either by stopping all the electrons striking it and allowing them to be conducted away by conductor 15, or by emitting an excess of secondary electrons when struck by primaries. If it is to operate by the first method, it should be made to emit as few secondary electrons as possible as by coating it with carbon, or by any other method of preventing emission of secondary electrons. If it is to operate by the second method, the more secondary electrons cylinder 14′ can be made to emit the better.

The importance of the fact just mentioned that it makes no difference in the amount of work done on the field of the circuit by the electrons in a resonator whether the electrons, after passing through the field, are allowed to strike the wall of the resonator, i. e., grid 5″, or are caused to pass through small apertures in the wall or grid, cannot be over-emphasized, for this fact frees us from the well known requirement that a control grid must be negatively biased to prevent it from extracting energy from the grid circuit due to an alternating current produced by electrons striking the grid. In the device of Fig. 2, the grid cathode resonator consists of the space within the concentric line of which cathode 1 and grid 2″ form part of the boundary, and it makes no difference whatever to the standing waves within this space what becomes of an electron after it has left the field contained in this space. Since this is true, it does not change the losses in the grid cathode circuit to make grid 2″ positive and allow electrons to strike it.

We will now consider the effect produced by grid 2″ in removing some of the electrons upon the power delivered to the circuit of which grid 2″ and grid 5″ are a part. In the first place, it is obvious that if grid 2″ is positive it will leave fewer electrons to excite the plate circuit. If grid 2″ removed an equal percentage of electrons throughout the cycle, the result would be a proportional reduction in the power delivered to the plate circuit. This would not be at all serious, but as a matter of fact the power reduction in the plate circuit will be less than this, and in some cases may even be reversed in sign. This is because there is a larger proportion of the electrons removed from the electron stream by grid 2″ when this grid is positive with respect to cathode 1, and it will be noted that electrons passing grid 2″ in this phase relation extract energy from the plate circuit instead of adding energy to it, and hence the more electrons of this phase relation removed by the grid the better. Hence, since the direct current conductance of grid 2″ is a measure of the electron current removed by grid 2″ over the whole cycle, and the alternating current conductance is a measure of the current removed as a result of the alternating current potential on grid 2″, the removal of current by grid 2″ will benefit the plate circuit if the alternating current conductance exceeds the direct current conductance. This is not likely to be true in general, but the alternating current conductance may be counted on to minimize the loss in power caused by the direct current conductance of grid 2″.

Figure 5:
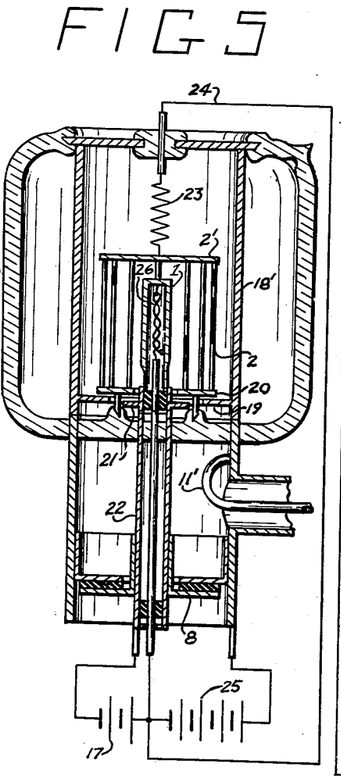
Fig. 5 shows in section an alternative form of the structure of Fig. 2.

In Fig. 5 is shown an alternative method of producing an oscillator. The basic mode of operation is the same as in Fig. 2. In Fig. 5, cathode 1 and grid 2″ are used as in Fig. 2. 18′ is a cylinder serving the same purpose as grid 5″ in Fig. 2. In this figure the flight time of electrons between cathode 1 and grid 2″ is preferably arranged to be about a half-cycle, and the flight time between grid 2″ and cylinder 18′ is preferably less than a quarter-cycle. An annular inwardly projecting flange 19 is provided on cylinder 18′, and serves to form a condenser with an annular ring 20, which is attached to the low ends of the grid wires of grid 2″. Annular ring 20 in turn forms a condenser with an annular ring 21, which latter ring is attached to the cathode 1. By means of these two condensers, the alternating current potential is divided so that the potential between cathode 1 and grid 2″ is a certain fraction of the potential between cathode 1 and cylinder 18′, and is substantially in phase with it. Cylinder 18′ and cathode 1 and the lower cylinder 22, which is a continuation of cathode 1, form a resonant concentric line which is closed by member 8′, which serves the same purpose as members 8′ and 9′ in Fig. 2. A resistor 23 connected between grid and cathode acts as the grid leak resistance generally used in a conventional oscillator. Resistor 23 is connected to cathode 1 through a wire 24, and tube 18′ is connected to the positive terminal of a battery 25. Cathode 1 is heated in the usual way by an indirect heater 26 which is energized by a battery 17. Since the phase relations between the various elements of the tube shown in Fig. 5 correspond to those in Fig. 2, it will be clear that the electrons will deliver energy to the fields in the same way as in Fig. 2. Energy can be removed from the concentric line 22—18' as by loop 11'.

Figures 6, 7:
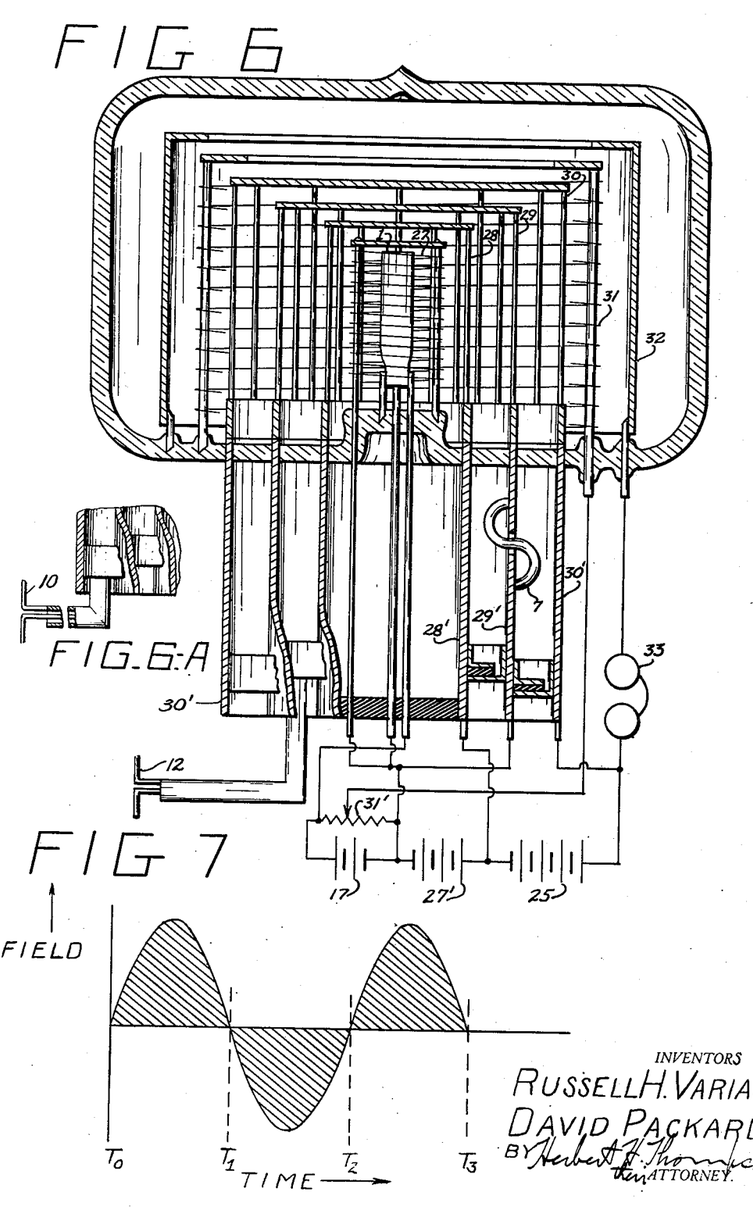
Fig. 6 is a sectional view of another embodiment which operates somewhat differently from Fig. 2.
Fig. 7 is an explanatory graph.
Figure 8:
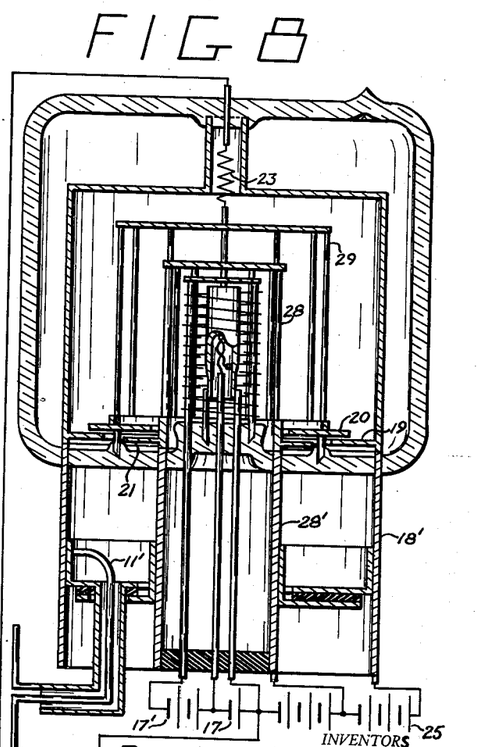
Fig. 8 shows an alternative form of the structure of Fig. 6 in section.

In Fig. 6 there is shown a somewhat different type of oscillator which makes use in a novel way of the well known so-called space charge grid. In this figure, 1 is the thermionic cathode as before. 27 is a grid which may be omitted if desired. Its function is to limit the electron emission from the cathode, but it does not develop alternating current potentials with respect to the cathode. In the drawings it is shown as electrically connected to the cathode heater, but in use it may be given any convenient fixed potential with respect to the cathode as by a battery 17' as shown in Fig. 8. An accelerating grid 28, concentric with grid 27, may be given any desired positive bias by battery 27', and the space current in the tube can be fixed independently of the bias on grid 28 by properly biasing grid 27. Grid 28 is positively biased with respect to cathode 1, but in the proper functioning of the tube there is no alternating current potential between grid 28 and the cathode 1.

A grid 29, exterior of and concentric with grid 28, is connected so as to be at substantially cathode potential so that a large part of the electrons passing through grid 28 are brought to rest and repelled back toward this grid. The distance between grids 28 and 29, and the average velocity of the electrons between grids 28 and 29, determine the flight time of the electrons between those grids. The average velocity of the electrons between grids 28 and 29 is determined by the potential difference between cathode 1 and grid 28. For the best functioning of the oscillator shown in Fig. 6 this flight time between 28 and 29 should be substantially a half-cycle of the resonant frequency of the circuit connecting grids 28 and 29, although a considerable departure from this value is possible.

The electrons will emerge into the interspace between grids 28 and 29 evenly distributed in time, and since the changes in electron velocity in this space caused by the alternating current field existing in the concentric structure between grids 28 and 29 is generally small compared to the average velocity of the electrons, the electrons will remain substantially uniformly distributed in time throughout this space except in the vicinity of the region where electrons are stopped and turned back, and this region is so close to grid 29 that the work done on the electrons from this point to grid 29 may be neglected. Hence, we can say that of the electrons traveling from grid 28 to grid 29, there are as many accelerated as retarded by the alternating current field between grids 28 and 29, and hence the average work done by the alternating current field is negligible. But the electrons which have been accelerated between grids 28 and 29 have a better chance of penetrating beyond grid 29 than the electrons that have been decelerated, and hence there will be fewer of these electrons returning from grid 29 to grid 28 than there are of the electrons that have been decelerated. Therefore, the electrons returning from grid 29 to grid 28 will not be uniformly distributed in time.

In Fig. 7, these conditions are illustrated graphically. The electrons that left grid 28 at time $T_0$ are the ones most accelerated, and the area under the sine curve between $T_0$ and $T_1$ is a measure of the velocity gained by this group of electrons in traversing the distance between grids 28 and 29. The velocity lost by the electrons most decelerated is represented by the area under the sine curve between times $T_1$ and $T_2$. Since there will be fewer of those electrons that left grid 28 at time $T_0$ returning to grid 28 from grid 29, and more nearly the full number of those electrons that left grid 28 at time $T_1$ returning to grid 28 from grid 29, there is a sinusoidal component of electron current density returning to grid 28 from grid 29. The maximum of this current of electrons will leave grid 29 at approximately $T_2$, and they will arrive at grid 28 at time $T_3$, and since grid 29 has been more positive than its mean value during the interval $T_3—T_2$, the electrons of this group will lose energy to the grid control circuit between grids 28 and 29; moreover, the energy they will lose will be a maximum.

If the electrons passing through grid 29 were merely thrown away, energy would be derived from the electron flow by the circuit of which grid 28 and 29 are a part, and this circuit would with a suitable current break into oscillation. However, the electrons that pass through grid 29 are not thrown away, but are caused to do further useful work.

This will be apparent when the operations of a grid 30 exterior of grid 29 is understood. As is shown in Fig. 6, the concentric line resonator consisting of grids 28 and 29 and the conducting tubes 28' and 29' connecting them is independent as far as currents of its resonant frequency are concerned from the adjoining concentric line resonator consisting of grids 29 and 30, and the conducting tubes 29' and 30' connecting them. Hence, if an alternating current of the frequency of the last mentioned resonator flows from grid 29 to grid 30, oscillations will spontaneously develop in the resonator of such phase as to extract a maximum of energy from the alternating current flowing from grid 29 and grid 30. If the tube in Fig. 6 is operated in this way, it is equivalent to an oscillator operating a power amplifier which is electron coupled to the oscillator. If desired, a coupling 7 may be inserted between the two concentric line resonators as is also shown in Fig. 2. This may be required if it is desired to produce oscillations with a current smaller than that necessary to cause the circuit of which grids 28 and 29 are a part to oscillate without help. If the device shown in Fig. 6 is used as an oscillator, the energy may be radiated by antenna 10' as shown in Fig. 6A, exactly as in the case of the device of Fig. 2A. If it is to be used as a receiver, the signal may be received on antenna 12'. It is not intended that the receiving and transmitting antenna be used on the same device.

If the device is used as a receiver, it may be used either as a regenerative detector or as an oscillator detector. It is probably more sensitive as an oscillator detector. The circuit consisting of grids 28 and 29 and the connecting conductors is allowed to oscillate, and a signal of a slightly different frequency is introduced from antenna 12'. The beats between these two frequencies cause the amplitude of oscillation to periodically vary, and this periodically varying oscillation will be amplified in the resonator consisting of grids 29 and 30 and their connecting conductors. The electrons after losing energy to the aforementioned resonant circuit will pass through grid 30, and encounter an opposing direct current field between grid 30 and a grid 31. Grid 31 is supplied with a relatively low direct current potential by potentiometer 31 connected across battery 17. The direct current field between 30 and 31 is of such strength that many of the electrons that are slowed down between grids 29 and 30 will be turned back, and since the number of electrons turned back will be dependent on the amplitude of oscillation in the circuit of which grids 28 and 29 are a part, the current flowing from cylinder 32 through a pair of connected earphones 33 will be a function of the amplitude of oscillation in the circuit of which grids 28 and 29 are a part. Thus, the incoming signal is detected.

The detector shown in Fig. 6 is different from the one shown in Fig. 2, but it operates on the same principle, namely that of discriminating between electrons according to the velocity with which they penetrate the respective preceding grids. It may be here emphasized that this type of detection is not used in existing three-electrode tube practice, nor is it usable in such practice without special circuit design.

It should be mentioned at this point that in all the figures, the grids have been shown with wires widely spaced so as to minimize confusion in the drawings. In actual tubes the grids would in general contain considerably more grid wires.

Fig. 8 illustrates an alternative arrangement of the device shown in Fig. 6. The only difference being that the control grid 29 is not a part of a concentric line resonator as in Fig. 6, but receives its alternating current potential by capacity coupling through annular rings 19, 20, and 21 as in Fig. 5, where similar parts bearing the same numbers serve the same purpose. Thus it will be apparent that the condenser rings of Fig. 5 may be used in lieu of the concentric lines provided in Figs. 2 and 6. Grid 28 is conductively connected through resistor 23 to a suitable point on the battery. All other parts may be readily identified by reference to Fig. 6 without further explanation.

Figure 9:
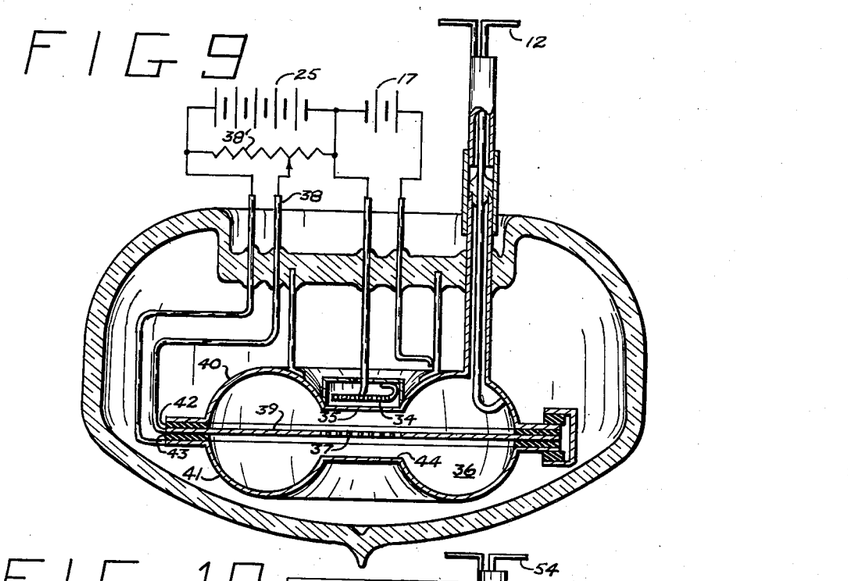
Fig. 9 shows an alternative form of the structure of Fig. 2, using a different type of resonant circuit.

In Fig. 9 an embodiment which operates somewhat similar to that of Fig. 2 is shown, the principal difference being the type of resonator used. 34 is a heating filament which heats a portion of the wall 35 of a resonator 36, which wall portion 35 is coated with an electron-emitting substance and serves as a cathode. 37 is the control grid which is suitably biased through lead 38 and potentiometer 38'. As has been previously explained, this grid may have a positive bias without introducing a resistive load on the resonant circuit. Grid 37 is located in the center of diaphragm 39, which may be a continuous conducting sheet if it is desired that the space above grid 37 be completely shielded from the space below grid 37, so that resonant oscillations may exist in both spaces without the oscillations below grid 37 reacting on the oscillations above grid 37; or it may be perforated so as to permit the interlinking of the fields above and below the diaphragm. As in Fig. 2, the flight time of the electrons between cathode 35 and grid 37 is arranged to be a half-cycle or a little more.

Diaphragm 39 is insulated from the shells of the resonator 40 and 41 by insulating washers 42 and 43, shown exaggerated in thickness. This allows cathode 35, grid 37, and anode 44 to be all operated at different direct current potentials, at the same time allowing the alternating currents in the walls of the resonator to flow freely because of the relatively high capacity through the insulating material. A dipole antenna 12' is shown that may be used to receive or radiate electromagnetic energy.

The theory of operation of this device is similar to that shown in Fig. 2, bearing in mind that the plate 44 of Fig. 9 acts similarly to the grid 5'' of Fig. 2.

Figure 10:
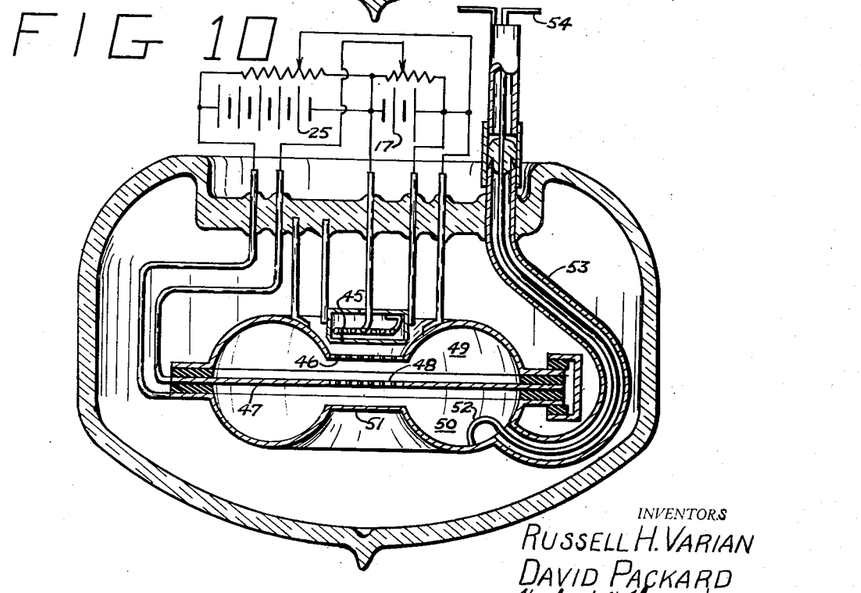
Fig. 10 shows an alternative form of the structure of Fig. 6, also using a different form of resonant circuit.

Fig. 10 is a cross sectional view of a modification of the device shown in Fig. 6 in which a different type of resonator is used for the resonant circuit. This resonator consists of a closed conducting metal shell which is generated by rotation of the cross section shown about the axis of symmetry of the cross section of the resonator as in Fig. 9. The diaphragm 47, containing grid 48, may be continuous, in which case closed space 49 is isolated from closed space 50, and these two closed spaces and their conducting boundaries act as two independent resonators, or suitable apertures may be made in diaphragm 47 so that the two spaces 49 and 50 become coupled resonators. Finally, nearly all the diaphragm may be removed so that spaces 49 and 50 become a single resonator. None of these changes will disturb the essential function of the device.

In the drawings, 45 is an indirectly heated cathode having a circular emitting surface facing grid 46. Grid 46 is made positive with respect to the cathode so that electrons are drawn from the cathode and pass through grid 46. After passing grid 46, they are slowed down by grid 48 which is ordinarily slightly negative with respect to cathode 45. A large part of the electrons come to a stop just in front of grid 48, and return to grid 46. There is then a virtual cathode formed at this point in front of grid 48. The electrons that have received energy from the alternating field in their passage from grid 46 to grid 48 have an increased probability of penetrating grid 48 and passing to anode 51. As the phase relations of the various groups of electrons and the mechanism whereby energy is supplied to the resonant circuits have already been explained in connection with Fig. 6, this will not be repeated. Grid 48 is insulated from the metal shells of resonators 49 and 50 in the same manner as is the case in the device shown in Fig. 9. Energy may be extracted from resonator 50 by loop 52, conducted over concentric line 53 and radiated from antenna 54. The device of Fig. 10 may also be used as a receiver and amplifier by coupling electromagnetic energy into resonator 49 by means similar to that shown previously in Fig. 6. In this case the current and potential may be adjusted so that the device will either fail to oscillate or will just oscillate. Anode 51 may be made into a grid, and a detector of the type shown in Fig. 2 or Fig. 6 may be placed behind such grid.

The type of detection made use of in the device described in Fig. 6 may be used at long wave lengths as well as at very short wave lengths, and without the use of concentric line resonators, if desired. The only requirement to obtain this end is that there must not be a difference of alternating current potential between the velocity discriminating grid, as 31 of Fig. 6 and the grid 30, performing the function of the plate in an ordinary tube, which is the inverse of the alternating current potential difference between the cathode and grid 30.

Figure 11:
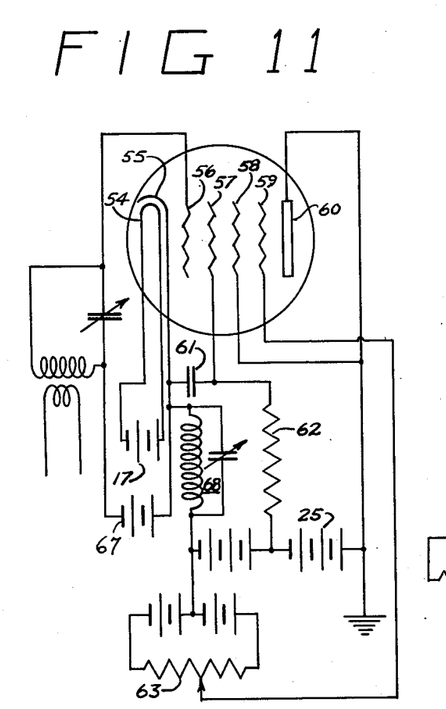
Fig. 11 shows an alternative form of the structure of Fig. 6 adapted for use at long wave lengths as well as at very short wave lengths.

Fig. 11 shows schematically a tube and circuit meeting these requirements. In this figure, 54 is the heater of a thermionic cathode, 55 is the cathode, 56 is the control grid, 57 is a screen grid, 58 is the grid that acts as the plate, 59 is the discriminating or detector grid, and 60 is the plate or collector of electrons.

Neglecting screen grid 57 for the time being, the emission of electrons from cathode 55 is controlled in the usual way by grid 56 that is biased by battery 67, and the periodically varying electron stream resulting from this control delivers power to the circuit connecting grid 58 and cathode 55 in the same way as power is delivered to the plate grid circuit in an ordinary three-electrode tube. The plate-cathode circuit includes the tuned circuit 68. The fact that grid 58 is grounded need cause no concern, as it is well known that a three-electrode tube may be made to work with any one of its elements grounded.

If large stable amplification is to be obtained in the tube, a screen grid is required, but since the plate is grounded, it cannot be grounded for alternating current as is ordinarily the case because such a screen would induce the same currents in the control grid as the plate would. An examination of the circuit shows that to eliminate induced currents in the control grid-cathode circuit from the power grid 58-cathode circuit (plate circuit) the screen grid must be at the same alternating current potential as the cathode. At the same time the screen grid must have a positive direct current potential. In Fig. 11 this is accomplished by connecting a bypass condenser 61 between the screen grid and the cathode, and connecting screen grid 57 through a resistor 62 to a suitable point on battery 25. The velocity discriminating grid 59 is suitably biased by potentiometer 63 which is connected to the negative end of the B battery 25.

Figure 12:
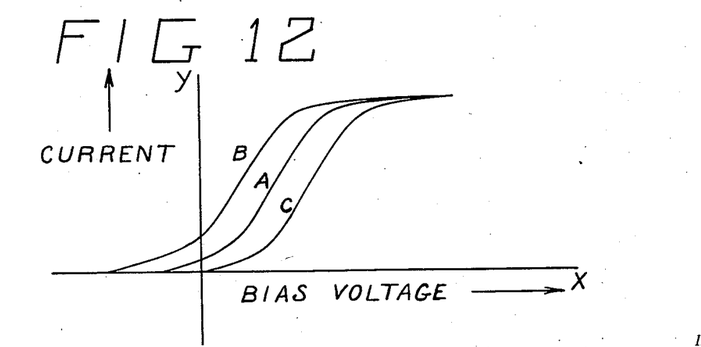
Fig. 12 shows characteristic curves of the tube of Fig. 11.

If the bias on grid 59 is varied, and the electron current passing through it to electrode 60 is plotted as function of the bias, the familiar S-shaped curve of current as a function of bias is obtained, such as curve A in Fig. 12. If now the electron velocity is increased very slightly curve B will be obtained, and if it is decreased by an equal amount curve C will be obtained. It will be noticed that for a particular bias, as for instance along the Y axis the curves B and C may not be equally distant from A. If this is the case, a sinusoidally varying velocity will cause the average current passing grid 59 to be different from the current that would pass if there were no sinusoidal variations. That is, there is a rectified component of current and the signal has been detected. There are two points where detection is most pronounced, one near the bottom of the S-shaped curves, and one near the top.

Figure 13:
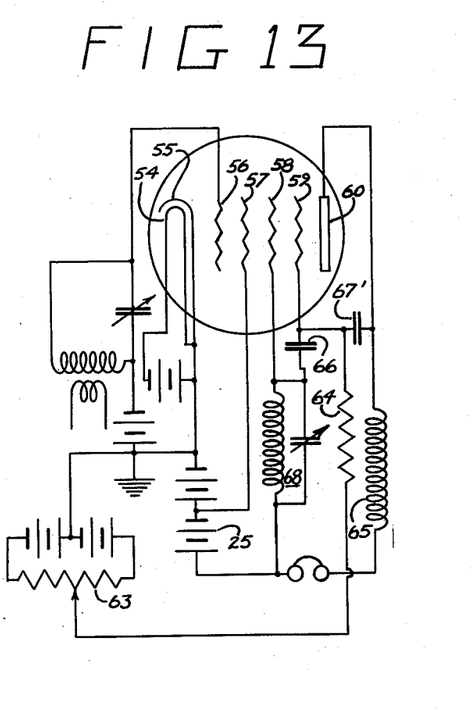
Fig. 13 illustrates a modification of the structure of Fig. 11.

Fig. 13 is a schematic diagram of an alternative circuit. The same tube will be suitable in either circuit. Since the tube is the same as that of Fig. 11, the same numbers are used to designate the parts. In Fig. 13 the cathode 55 is grounded. Control grid 56, and screen grid 57 are connected in the conventional way, and grid 58 is connected in the usual way for the plate of an amplifier tube. Grid 59 is connected through resistor 64 and potentiometer 63 to the cathode. Electrode 60 is connected through inductance 65 to the positive end of the battery. Grid 59 and electrode 60 are connected to grid 58 by bypass condensers.

The operation of the device shown in Fig. 13 is essentially the same as that of Fig. 11, the differences being merely those resulting from the grounding of a different element of the tube. In order for the tube to operate properly the discriminating grid 59 must have substantially the same alternating current potential as the grid acting as plate 58, and in order for maximum alternating current energy to be delivered to the circuit between grid 58 and cathode 55, collector plate 60 must have substantially the same alternating current potential as grid 58. Grid 59 and collector plate 60 are accordingly connected to grid 58 by condensers 66 and 67'.

The tube used in the devices of Figs. 11 and 13 is not a standard commercial tube, but nothing need be added to the known art of tube construction to make it and therefore a detailed drawing of the tube construction is not shown. The principal advantage of the type of detector shown in Figs. 11 and 13 is that, without undue complication, the advantage of one stage of radio frequency amplification plus detection is obtained in a single tube. If in Fig. 13 the bias is shifted so that when oscillations are present in the tube, some of the faster electrons strike grid 59, a somewhat different form of detection is obtained. The same change in type of detection may be obtained in Fig. 11 by inserting a high resistance in series with grid 59, and then biasing the grid so that a few electrons may strike it.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electron space current producing device, two electrically resonant concentric lines concentrically located with respect to each other and having apertured walls, the outer member of the inner concentric line constituting the inner member of the outer concentric line, means for passing electron space current through the wall apertures of said concentric lines, one of said concentric lines providing an alternating electric field for controlling said electron space current and the other of said concentric lines providing an alternating electric field for removing energy from the thusly controlled electron space current, means for closing the ends of said concentric lines to eliminate extraneous coupling therebetween, and means interconnecting the fields of said concentric lines for obtaining controlled coupling therebetween.

2. In a thermionic vacuum tube and circuit, a cathode, an anode, a control grid, an accelerating grid between said cathode and said control grid, means for maintaining said accelerating grid at a higher direct current potential than said control grid and cathode, a hollow resonant circuit connected between said accelerating grid and said control grid so that said grids constitute portions of the boundary walls of said circuit, thereby subjecting electrons passing through said accelerating grid to an alternating electric field, said hollow resonant circuit having a resonant frequency such that when oscillations are present in said resonant circuit a part of the electrons passing from the cathode through the accelerating grid will approach the control grid and, due to the lower direct current potential of the latter, come to rest very close to this control grid in approximately one-half cycle of the frequency of said resonant circuit, thereby imparting energy to the circuit, and a part of said electrons will pass on through said control grid, an additional hollow resonant circuit for establishing an oscillating electric field between said control grid and said anode, said control grid and anode constituting portions of the boundary walls of said additional circuit, said last named part of the electrons exciting said additional hollow resonant circuit, and means for closing the ends of said hollow resonant circuits and for controlling the phases of the fields therein.

3. In a receiver of the character described, an electron emitting cathode, hollow resonant circuit means including a grid operating on the principle of space charge control, means for applying signal control potentials to said grid, a second hollow resonant circuit concentric with said first resonant circuit for deriving oscillatory energy from the electrons emitted from said cathode, a grid concentric with said second hollow resonant circuit for segregating said electrons into two groups according to their velocities subsequent to the derivation of said oscillatory energy, and means for collecting one group of electrons so segregated.

4. In a thermionic vacuum tube and circuit, a cathode, an anode, a control grid, an accelerating grid, a first hollow resonator having standing electromagnetic waves confined therewithin and having said accelerating grid as a portion of one boundary thereof and said control grid as a portion of another boundary thereof, a second hollow resonator having standing electromagnetic waves confined therewithin having said control grid as a portion of one boundary thereof and said anode as a portion of another boundary thereof, accelerating voltage means for driving electrons from said cathode through the standing waves of said resonators in succession, the electrons being so grouped and phased by the waves within said first hollow resonator that they do work upon the standing waves within said second hollow resonator, and independent tuning means for selectively tuning said hollow resonators extending thereinto, said resonators having coupling means extending therebetween for exciting said first resonator from the second.

RUSSELL H. VARIAN.
DAVID PACKARD.